United States Patent
Davito (10) Patent No.: US 11,451,445 B2
(45) Date of Patent: Sep. 20, 2022

(54) EFFICIENT INTERNET-OF-THINGS DEVICE CONFIGURATION VIA QUICK RESPONSE CODES

(71) Applicant: ITRON NETWORKED SOLUTIONS, INC., Liberty Lake, WA (US)

(72) Inventor: Brandon Davito, Liberty Lake, WA (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 0 days.

(21) Appl. No.: 16/604,149

(22) PCT Filed: Apr. 10, 2018

(86) PCT No.: PCT/US2018/026787
§ 371 (c)(1),
(2) Date: Oct. 9, 2019

(87) PCT Pub. No.: WO2018/191198
PCT Pub. Date: Oct. 18, 2018

(65) Prior Publication Data
US 2020/0127896 A1    Apr. 23, 2020

Related U.S. Application Data

(60) Provisional application No. 62/483,905, filed on Apr. 10, 2017.

(51) Int. Cl.
*H04L 41/08*   (2022.01)
*H04W 4/70*    (2018.01)
(Continued)

(52) U.S. Cl.
CPC ........ *H04L 41/0886* (2013.01); *G06K 7/1417* (2013.01); *H04L 41/0806* (2013.01);
(Continued)

(58) Field of Classification Search
CPC ..... H04W 12/06; H04W 4/029; H04W 84/12; H04W 4/14; H04W 4/80; H04W 8/18;
(Continued)

(56) References Cited

U.S. PATENT DOCUMENTS 9,949,331 B1 *   4/2018   Coombes ............... H05B 45/20
2007/0038743 A1 *   2/2007   Hellhake ........... H04L 29/12283
                                                              709/224
(Continued)

FOREIGN PATENT DOCUMENTS

WO    2016/129211 A1    8/2016

OTHER PUBLICATIONS

International Search Report for Application No. PCT/US2018/026787, dated Jun. 26, 2018, 9 pages.
(Continued)

*Primary Examiner* — Djenane M Bayard
(74) *Attorney, Agent, or Firm* — Artegis Law Group, LLP (57) ABSTRACT

A central controller is configured to obtain a scan of a quick response (QR) code affixed to an internet-of-things (IoT) device. The central controller decodes the QR code to extract various operating parameters associated with the IoT device. The central controller then provisions a device controller for coordinating operation of the IoT device. The central controller configures the device controller based on the operating parameters, thereby allowing the device controller to coordinate operations of the IoT device in a device-specific manner. The central controller may then install the device controller on the IoT device, or cause the device controller to coordinate IoT device operations across
(Continued)

a network. With this approach, a technician is no longer required to manually obtain IoT device operating parameters or input those parameters to a central controller, thereby streamlining the IoT device installation process.

20 Claims, 7 Drawing Sheets (51) Int. Cl.
    *H04L 41/0806* (2022.01)
    *H04L 67/125* (2022.01)
    *H04L 67/00* (2022.01)
    *H04W 84/18* (2009.01)
    *H05B 47/19* (2020.01)
    *G06K 7/14* (2006.01)

(52) U.S. Cl.
    CPC ............ *H04L 67/125* (2013.01); *H04L 67/34* (2013.01); *H04W 4/70* (2018.02); *H05B 47/19* (2020.01); *H04W 84/18* (2013.01)

(58) Field of Classification Search
    CPC ..... H04W 12/001; H04W 4/38; H04W 4/025; H04W 12/08; H04W 52/02; H04W 84/18; H04W 4/24; H04W 4/70; H04W 48/16; H04W 24/08; H04W 28/02; H04W 4/50; H04W 52/0229; H04W 52/0235; H04W 88/06; H04W 88/08; H04W 28/0268; H04W 40/02; H04W 4/02; H04W 4/20; H04W 52/0216; H04W 12/00; H04W 12/0017; H04W 12/0027; H04W 12/003; H04W 12/02; H04W 12/04; H04W 12/0401; H04W 12/0609; H04W 28/0215; H04W 28/12; H04W 48/14; H04W 4/12; H04W 4/16; H04L 41/0886; H04L 41/0806; H04L 67/125; H04L 67/34; H04L 41/0876; H04L 69/22; H04L 63/0236; H04L 63/0428; H04L 63/0876; H04L 67/02; H04L 63/1441; H04L 67/22; H04L 29/06; H04L 67/12; H04L 63/1408; H04L 69/08; H04L 9/3228; H04L 43/028; H04L 43/06; H04L 63/0227; H04L 63/0272; H04L 63/0414; H04L 63/067; H04L 63/145; H04L 63/1458; H04L 63/205; H04L 9/0894; H04L 9/3226; H04L 2209/38; H04L 67/10; H04L 9/3239; H04L 12/2818; H04L 2209/805; H04L 29/08099; H04L 29/08567; H04L 41/12; H04L 41/14; H04L 41/22; H04L 41/50; H04L 43/12; H04L 63/0254; H04L 63/0869; H04L 63/1416; H04L 63/168; H04L 67/025; H04L 9/0838; H04L 2209/34; H04L 2209/56; H04L 2209/80; H04L 29/08144; H04L 29/08225; H04L 45/745; H04L 47/19; H04L 47/24; H04L 47/781; H04L 47/823; H04L 47/826; H04L 63/0478; H04L 63/06; H04L 63/105; H04L 63/12; H04L 63/16; H04L 63/164; H04L 63/166; H04L 63/20; H05B 47/19; G06K 7/1417
    See application file for complete search history.

(56) References Cited

U.S. PATENT DOCUMENTS

| | | |
|---|---|---|
| 2014/0042933 A1 | 2/2014 | Livschitz et al. |
| 2014/0181521 A1* | 6/2014 | Hemphill .............. H04L 9/0819 713/171 |
| 2015/0245204 A1* | 8/2015 | Heydon .................. H04L 41/14 713/171 |
| 2017/0105129 A1* | 4/2017 | Teplin ................. H04L 41/0806 |
| 2018/0145844 A1* | 5/2018 | Pera .................... H04L 12/2838 |

OTHER PUBLICATIONS

Extended European Search Report for application No. 18784484.0 dated Aug. 17, 2020.

* cited by examiner

EFFICIENT INTERNET-OF-THINGS DEVICE CONFIGURATION VIA QUICK RESPONSE CODES

CROSS-REFERENCE TO RELATED APPLICATIONS

The present application is a national stage application of the international application titled, "EFFICIENT INTERNET-OF-THINGS DEVICE CONFIGURATION VIA QUICK RESPONSE CODES," filed on Apr. 10, 2018 and having serial number PCT/US2018/026787, which claims priority benefit of U.S. provisional patent application titled, "INTERNET OF THINGS INSTALLATION WITH QUICK RESPONSE CODES" filed Apr. 10, 2017 and having Ser. No. 62/483,905. The subject matter of these related applications is hereby incorporated herein by reference.

CROSS-REFERENCE TO RELATED APPLICATIONS

This application claims the benefit of United States provisional patent application titled, "Internet of Things Installation with Quick Response Codes," filed on Apr. 10, 2017 and having Ser. No. 62/483,905. The subject matter of this related application is hereby incorporated herein by reference.

BACKGROUND OF THE INVENTION

Field of the Invention

Embodiments of the present invention relate generally to wireless network communications and, more specifically, to efficient internet-of-things device configuration via quick response codes.

Description of the Related Art

The internet is a global network infrastructure that couples together numerous computing devices and allows those devices to perform network communications with one another. The "internet-of-things" is built upon the internet and includes devices that are not traditionally associated with traditional computing, including streetlights, traffic signals, utility meters, and so forth. Such devices are sometimes referred to as "internet-of-things" devices, or "IoT" devices.

A conventional IoT device oftentimes interacts with a central server that is configured to control the operation of the IoT device via the internet. For example, a street light could be coupled to a central server that is configured to manage the activation cycle associated with the streetlight. Such centralized control provides a convenient way to modify the behavior of many connected IoT devices simultaneously.

In order to set up an IoT device, a technician first installs the IoT device hardware in a physical location. Then, the technician interfaces with a central server to provision a device controller for managing operations of the IoT device. In performing this latter step, the technician manually obtains device-specific operational parameters and then inputs these parameters to the central server. The central server then configures the device controller based on the device-specific operational parameters. For example, to set up an IoT street light, the technician would first install the street light at a physical location and couple the street light to a power source and to the internet. The technician would then interact with the street light to obtain device-specific operational parameters, such as operating wattage, lumen output, maximum operating temperature, and so forth. The technician would record the operational parameters and input those parameters to a central server. The central server would then configure a device controller to manage the operation of the streetlight in accordance with the parameters. In this example, the central server could configure the device controller to monitor the operating temperature of the street light and shut off the street light when the operating temperature exceeds a maximum temperature set forth in the operating parameters.

One drawback of the above approach is that technicians are required to manually interact with IoT devices during installation in order to obtain the relevant operational parameters for those devices. Another drawback is that technicians are required to manually input those parameters to a central server. These manual operations can be cumbersome and time-consuming. Further, manual data entry is error prone. If the operational parameters are input incorrectly, then the device controller can end up being configured improperly, potentially causing the IoT device to malfunction.

As the foregoing illustrates, what is needed in the art are more effective ways to set up IoT devices.

SUMMARY OF THE INVENTION

One embodiment of the present invention sets forth a computer-implemented method for controlling nodes across a mesh network, including processing an image to extract a set of operating parameters associated with a first node that is coupled to the mesh network, configuring a first device controller based on the set of operating parameters extracted from the image, wherein the first device controller controls the first node across the mesh network, and causing the first node to perform at least one operation based on one or more operating parameters included in the set of operating parameters.

One advantage of the techniques described herein is that a technician no longer needs to manually obtain the various operating parameters associated with the IoT device during installation. Another advantage is that the technician no longer needs to manually input these operating parameters to the central controller to configure a controller for the IoT device. Accordingly, the disclosed techniques eliminate multiple manually-performed steps from a conventional IoT device installation procedure. Therefore, these techniques represent a technological advancement compared to conventional approaches.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As discussed above, a conventional approach to configuring an IoT device requires a technician to manually obtain operating parameters associated with the device and then manually input these parameters to a central control server. These manual steps are cumbersome, time consuming, and error-prone. Further, performing any of these steps incorrectly may cause device malfunction or failure.

To address these issues, embodiments of the invention include a central controller configured to obtain a scan of a quick response (QR) code affixed to an internet-of-things (IoT) device. The central controller decodes the OR code to extract various operating parameters associated with the IoT device. The central controller then provisions a device controller for coordinating operation of the IoT device. The central controller configures the device controller based on the operating parameters, thereby allowing the device controller to coordinate operations of the IoT device in a device-specific manner. The central controller may then install the device controller on the IoT device, or cause the device controller to coordinate IoT device operations remotely across a network.

One advantage of the techniques described herein is that a technician no longer needs to manually obtain the various operating parameters associated with the IoT device during installation. Another advantage is that the technician no longer needs to manually input these operating parameters to the central controller to configure a controller for the IoT device. Accordingly, the disclosed techniques eliminate multiple manually-performed steps from a conventional IoT device installation procedure. Therefore, these techniques represent a technological advancement compared to conventional approaches.

System Overview

Figure 1:
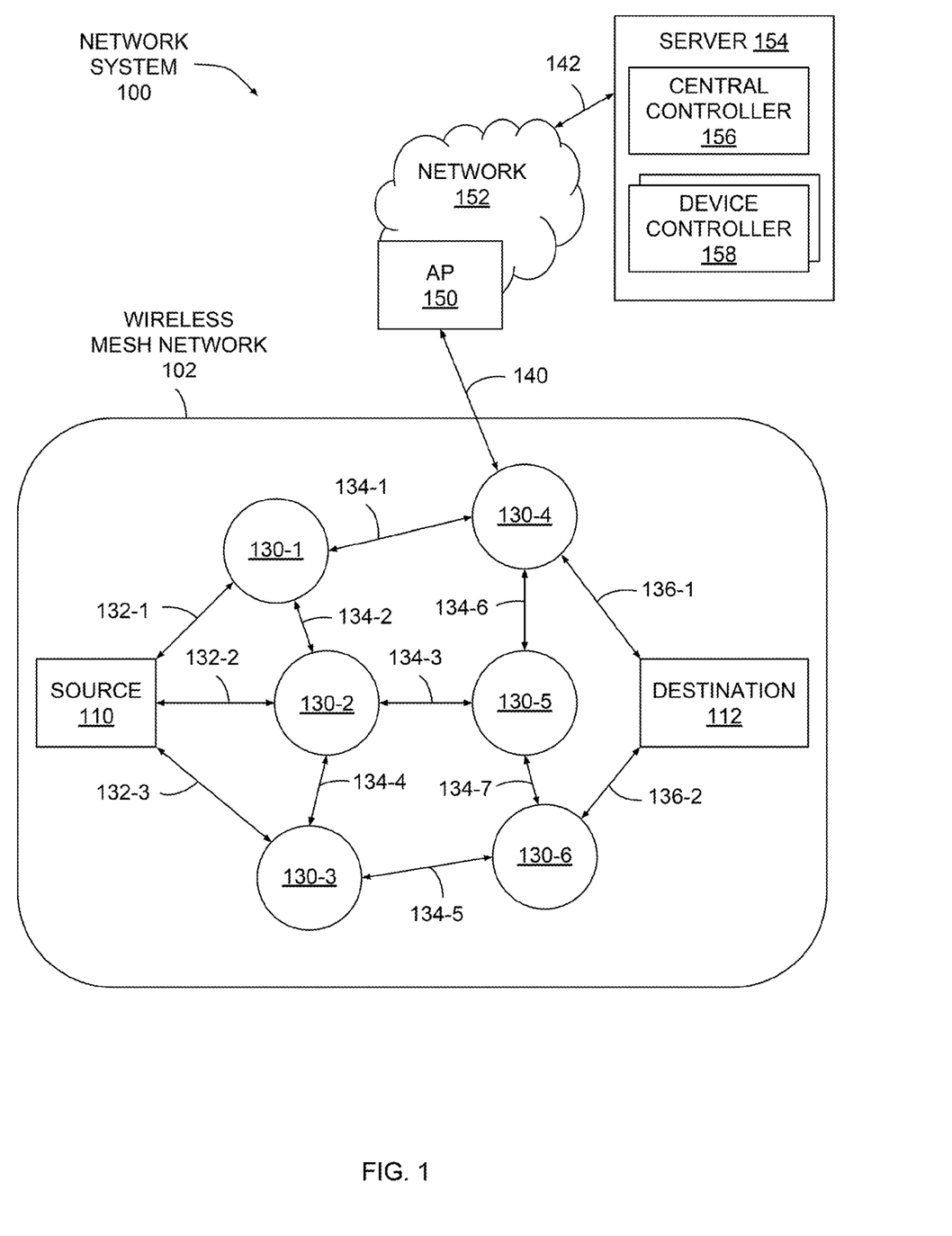
FIG. 1 illustrates a network system configured to implement one or more aspects of the present embodiments.

FIG. 1 illustrates a network system configured to implement one or more aspects of the present invention. As shown, the network system 100 includes a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154. Server 154 includes a central controller 156 and one or more device controllers 158. Any of the elements within network system 100 may be continuously powered and coupled to a power grid or battery powered and including one or more internal batteries.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. Once adjacency is established between the source node 110 and at least one intermediate node 130, the source node 110 may generate payload data for delivery to the destination node 112, assuming a path is available. The payload data may comprise an Internet protocol (IP) packet, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple routes to the destination address, and each of the multiple routes may include one or more cost values. Any technically feasible type of cost value may characterize a link or a route within the network system 100. In one embodiment, each node within the wireless mesh network 102 implements similar functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

Figure 5:
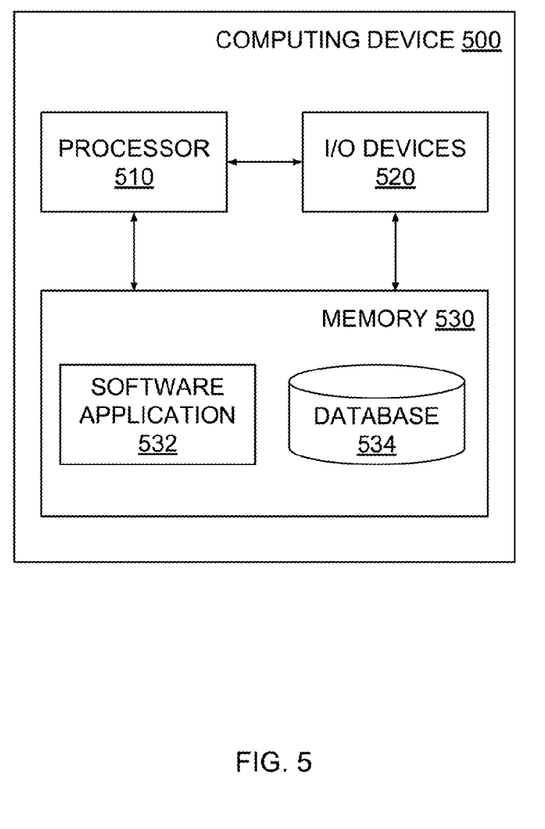
FIG. 5 illustrates a computing device that can be implemented in the system of FIG. 1, according to various embodiments.

In one embodiment, the server 154 represents a destination for payload data originating within the wireless mesh network 102 and a source of payload data destined for one or more nodes within the wireless mesh network 102. In one embodiment, the server 154 is a computing device, including a processor and memory, and executes an application for interacting with nodes within the wireless mesh network 102. FIG. 5 illustrates an exemplary computing device that may be configured to implement server 154. Nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

As described in greater detail below in conjunction with FIGS. 3A-3B, wireless mesh network 102 may be configured to operate as part of the "internet-of-things" (IoT). Further, nodes 130 may operate as IoT devices that can be controlled via server 154. As a general matter, an IoT device includes any technically feasible electronic or mechanical device capable of communicating via a network and/or being controlled via a network. Central controller 156 within server 154 is a software application that, when executed by a processor, performs various operations for provisioning device controllers 158 to coordinate the operation of nodes 130 within the internet-of-things.

In the context of this disclosure, the term "provisioning" generally refers to the act of allocating storage space and/or processor time for the execution of a given set of program instructions associated with a particular device controller. In provisioning a given device controller 158, central controller 156 may obtain operating parameters associated with a corresponding node 130 and then configure the device controller 158 based on those operating parameters. In the context of this disclosure, the term "configuring," when used in relation to the term "provisioning," generally refers to the act of setting various constants defined in a recently provisioned device controller to particular numerical values. The provisioning and configuration steps described herein may be performed automatically without significant human intervention and without any manual data entry. Accordingly, central controller 156 provides a streamlined approach to installing IoT devices for operation on the internet-of-things.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement any and all embodiments of the invention by operation of the network interface. An exemplary network interface is described below in conjunction with FIG. 2.

Figure 2:
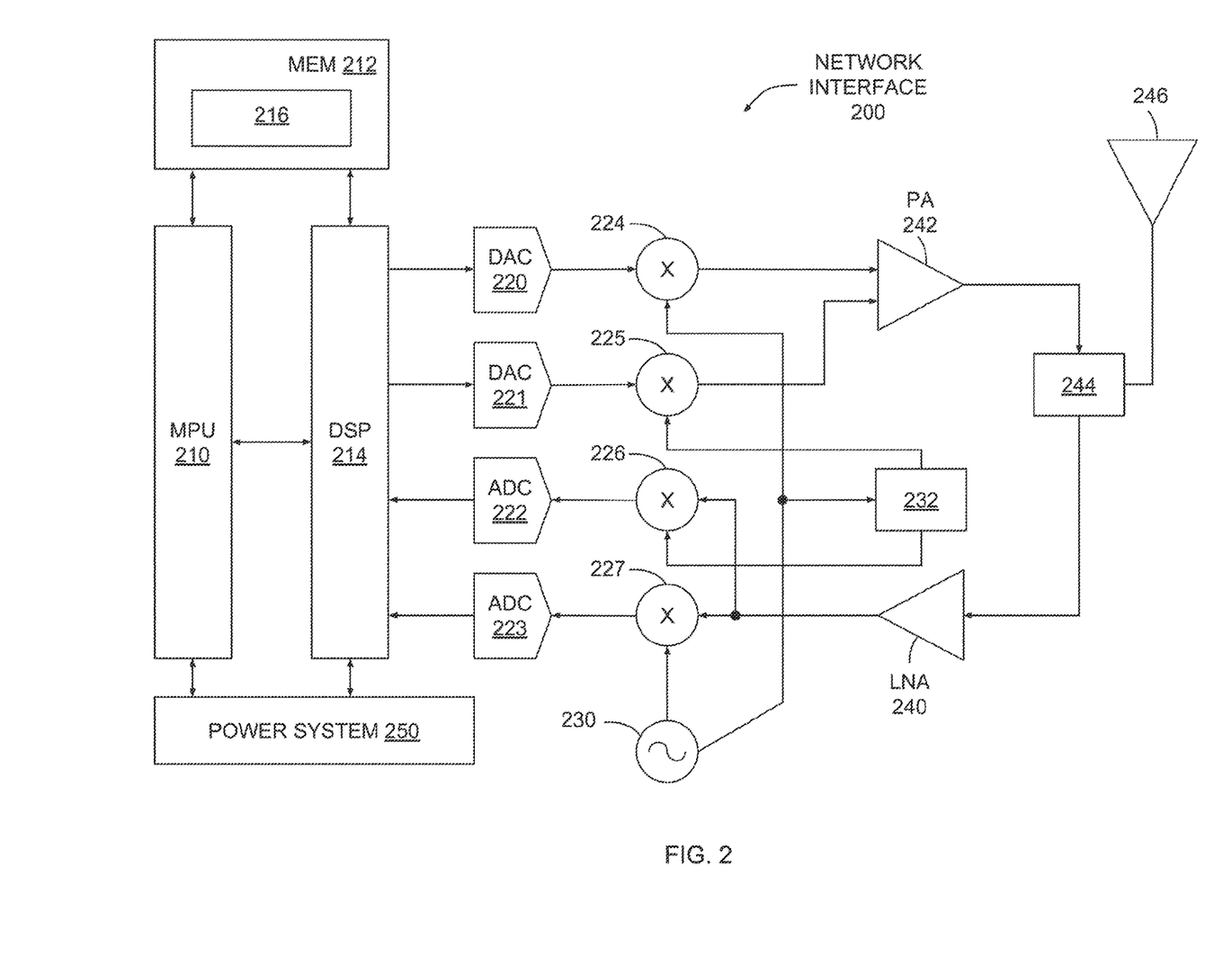
FIG. 2 illustrates a network interface configured to transmit and receive data within the mesh network of FIG. 1, according to various embodiments.

FIG. 2 illustrates a network interface configured to transmit and receive data within the mesh network of FIG. 1, according to various embodiments of the present invention.

Each node 110, 112, 130 within the wireless mesh network 102 of FIG. 1 includes at least a portion of the network interface 200. As shown, the network interface 200 includes, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, an antenna 246, and a power system 250. Oscillator 230 may be coupled to a clock circuit (not shown) configured to maintain an estimate of the current time. MPU 210 may be configured to update this time estimate, and other data associated with that time estimate.

A memory 212 may be coupled to the MPU 210 and/or DSP 214 for local program and data storage. Memory 212 may be used to buffer incoming data as well as store data structures such as, e.g., a forwarding database, and/or routing tables that include primary and secondary path information, path cost values, and so forth. In one embodiment, memory 212 may also store a client program 216 configured to coordinate the operation of network interface 200 and/or the node 130 that includes network interface 200. Client program 216 may be stored in memory 212 by device controller 158 when network interface 200 is initially configured during an installation process. FIGS. 3A-3D depict one such installation process via which device controller 158 stores client program 216 in memory 212. In alternative embodiments, device controller 158 coordinates the operation of node 130 and network interface 200 remotely without the need for client program 216.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node when MPU 210 executes a firmware program stored in memory within network interface 200.

The MPU 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, MPU 210 and/or DSP 214 are configured to buffer incoming data within memory 212. The incoming data may be buffered in any technically feasible format, including, for example, raw soft bits from individual channels, demodulated bits, raw ADC samples, and so forth. MPU 210 and/or DSP 214 may buffer within memory 212 any portion of data received across the set of channels from which antenna 246 receives data, including all such data. MPU 210 and/or DSP 214 may then perform various operations with the buffered data, including demodulation operations, decoding operations, and so forth.

MPU 210, DSP 214, and potentially other elements included in network interface 200 are powered by power system 250. Power system 250 may include multiple types of batteries, including longer lifetime cells that operate at higher voltages and shorter lifetime cells that operate at lower voltages. In one embodiment, a higher voltage cell within power system 250 intermittently charges a lower voltage cell within power system 150, and network interface 200 only draws power from the lower voltage cell.

Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Configuring IoT Devices Via QR Codes

Figure 3A:
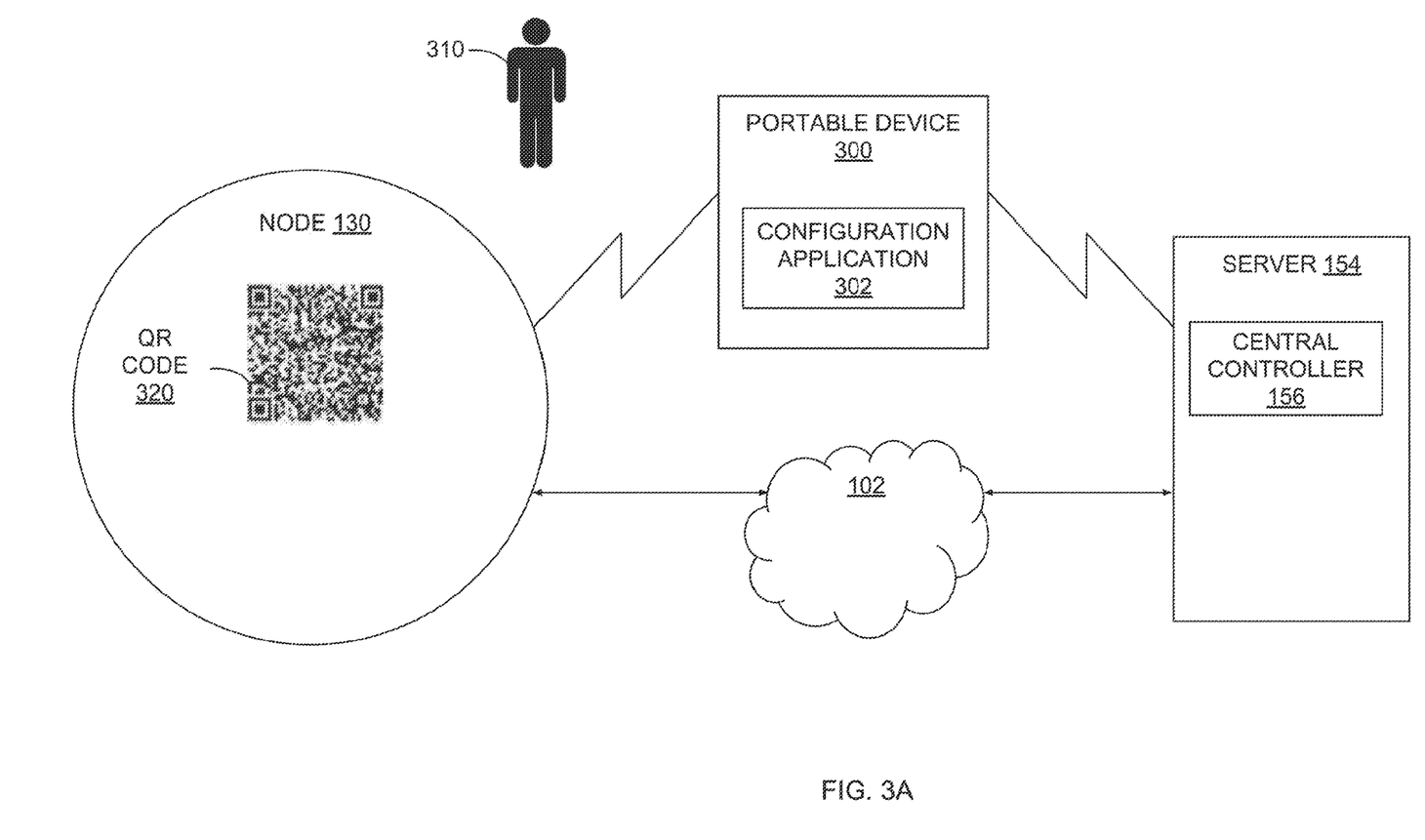
FIGS. 3A-3C illustrate how the server of FIG. 1 configures a node to be controlled across a network, according to various embodiments.
Figure 3B:
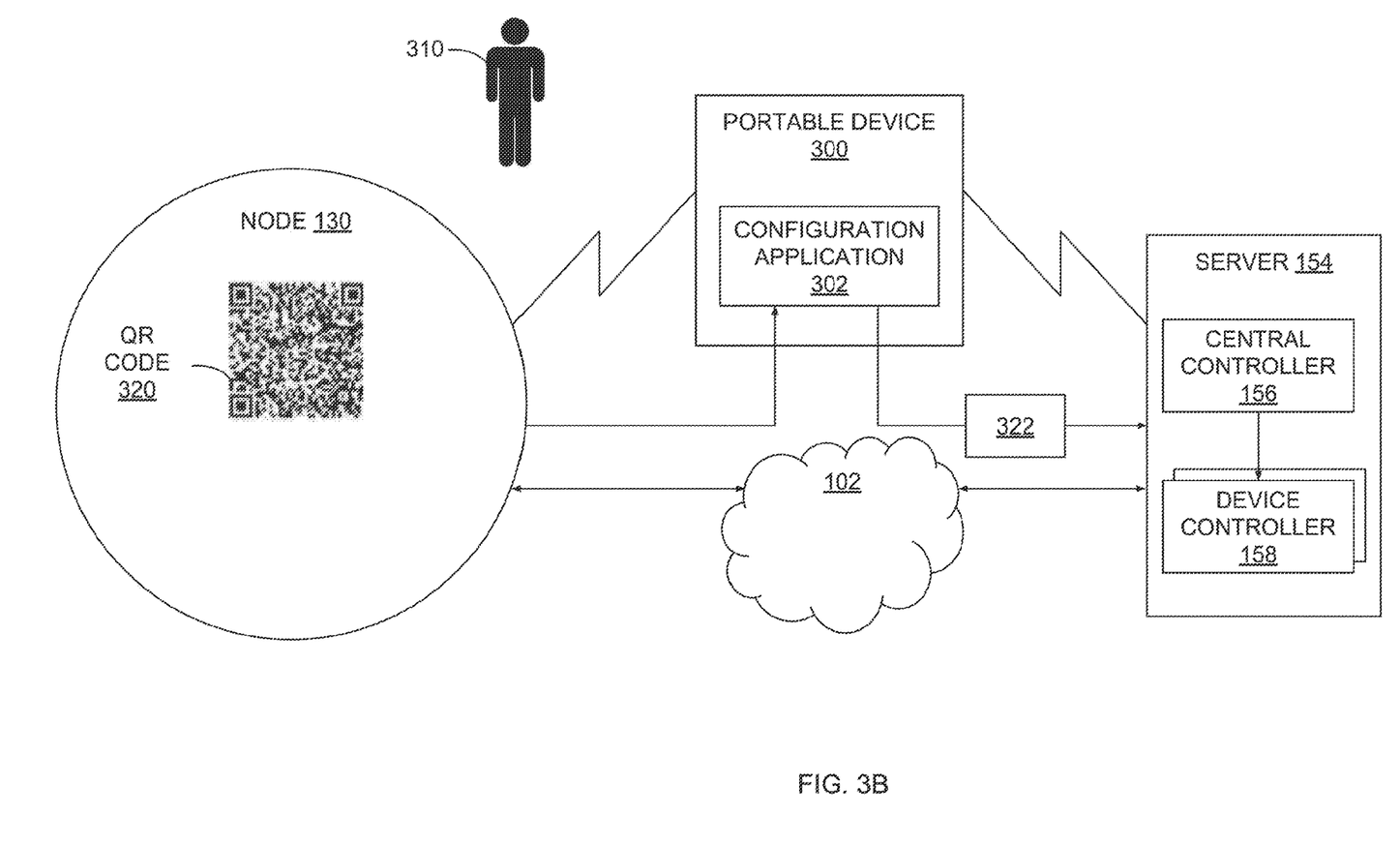
Figure 3C:
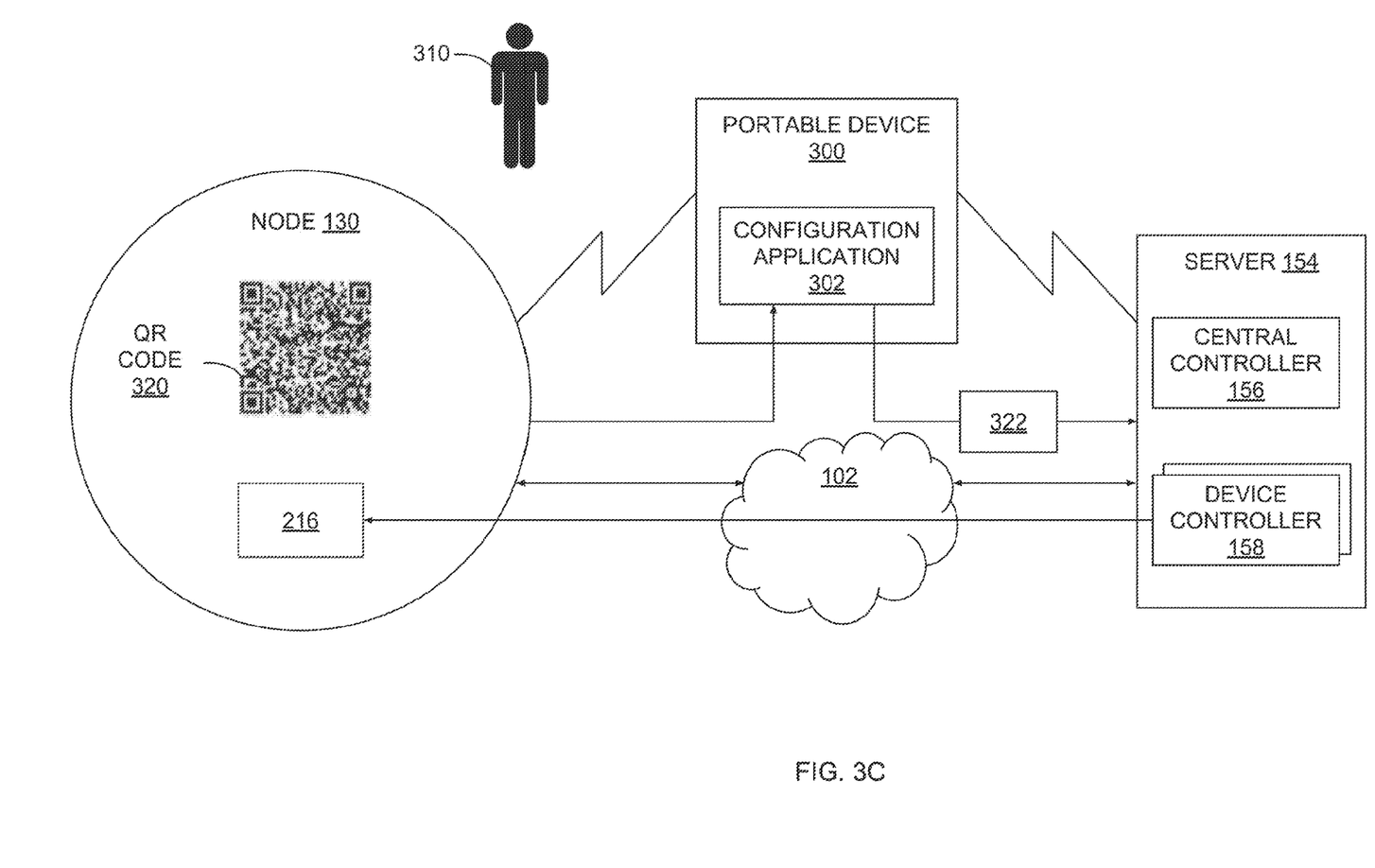

FIGS. 3A-3C illustrate how the server of FIG. 1 configures a node to be controlled across a network, according to various embodiments.

As shown in FIG. 3A, a portable device 300 is coupled between a node 130 and server 154. Node 130 may be any technically feasible IoT device. Portable device 300 is operated by a technician 310 who is responsible for physically installing node 130 at a particular physical location. Portable device 300 may be coupled to a cell network and configured to communicate with server 154 via the cell network. Portable device 300 executes a configuration application 302 that participates in configuring node 130 to operate as an IoT device on wireless mesh network 102. An exemplary computing device that may implement portable device 300 and execute configuration application 302 is described in greater detail below in conjunction with FIG. 5.

Referring now to FIG. 3B, technician 310 physically installs node 130 by mounting node 130 to a particular location, coupling a power source to node 130, and/or coupling node 130 to wireless mesh network 102, among other operations typically involved with hardware installation. Once node 130 is installed in this manner, installation application 302 captures a scan of a QR code 320 that is affixed to node 130. For example, technician 310 could manipulate portable device 300 to capture an image of QR code 320 using configuration application 302. QR code 320 encodes various operating parameters associated with node 130 that relate to the specific functionality of node 130.

For example, suppose node 130 is a luminaire device configured to emit light. QR code 320 could encode the wattage at which the luminaire operates, a lumen range for the luminaire, a maximum operating temperature of the luminaire, and other operating parameters typically associated with light emitting devices. QR code 320 could also include the luminaire type, manufacturer, date of manufacture, and other metadata commonly associated with luminaires. As discussed above in conjunction with FIG. 1, node 130 may be any technically feasible IoT device. Accordingly, QR code 320 may encode any technically relevant operating parameters (and other metadata) associated with IoT devices.

Upon scanning QR code 320, configuration application 302 generates QR code data 322. Configuration application 302 may process QR code 320 and extract operating parameters and metadata included therein to generate QR code data 322. Alternatively, configuration application 320 may simply capture an image of QR code 320 and include that image into QR code data 322. Configuration application 302 transmits QR code data to central controller 156 within server 154.

Referring now to FIG. 3C, central controller 156 receives QR code data 322 and then generates device controller 158. In doing so, central controller 156 provisions device controller 158 with storage space and/or processor time for use in monitoring and issuing commands to node 130. Such resources may be available on server 154 and/or node 130. Central controller 156 may also select a particular type of device controller based on the type of node 130. For example, if node 130 is a luminaire device, as discussed above, then central controller 156 could select a particular device controller 158 that includes control algorithms specific to controlling luminaires.

Upon provisioning resources to device controller 158, central controller 156 then configures various constants and/or defaults within device controller 158 based on QR code data 322. For example, if node 130 is a luminaire device, then central controller 156 could set a maximum operating temperature value defined within device controller 158 to equal the maximum operating temperature set forth in the operating parameters encoded in QR code data 322. Subsequently, during monitoring and control of node 130, if device controller 158 determines that the operating temperature of node 130 exceeds the maximum operating temperature, then device controller 158 could temporarily shut off node 130.

Central controller 156 may configure device controller 158 to operate node 130 remotely via wireless mesh network 102. In such cases, device controller 158 executes on server 154 and performs network communications with node 130 to perform the various monitoring and control operations discussed above. In addition, central controller 156 may also configure device controller 158 to execute, at least partially, on node 130. In these cases, device controller 158 may transmit client program 216 to node 130, as mentioned above in conjunction with FIG. 2. Client program 216 may include some or all program instructions associated with device controller 158. In one embodiment, client program 216 is an instance of device controller 158. Client program 216 facilitates network communications between node 130 and device controller 158 and also causes node 130 to perform various operations at the behest of device controller 158 and/or central controller 156.

Device controller 158 generally operates under the control of central controller 156. Central controller 156 may thus cause numerous nodes 130 to perform various operations by interacting with the corresponding device controllers 158. For example, central controller 156 could issue the same command to many device controllers 158. Each device controller 158 would then cause an associated node 130 to execute a corresponding operation. In doing so, a given device controller 158 would command the associated node 130 to perform such an operation based on the relevant operating parameters with which the device controller 158 is configured.

With the approach described above, QR code scan data is used to provision and configure a device controller for controlling the device from which the QR code scan data is captured. This approach eliminates multiple manual steps required by conventional approaches to installing and configuring IoT devices. Accordingly, the disclosed techniques represent a technological solution to a technological problem. The various techniques discussed above are also described in stepwise fashion below in conjunction with FIG. 4.

Procedure for Configuring an IoT Device

Figure 4:
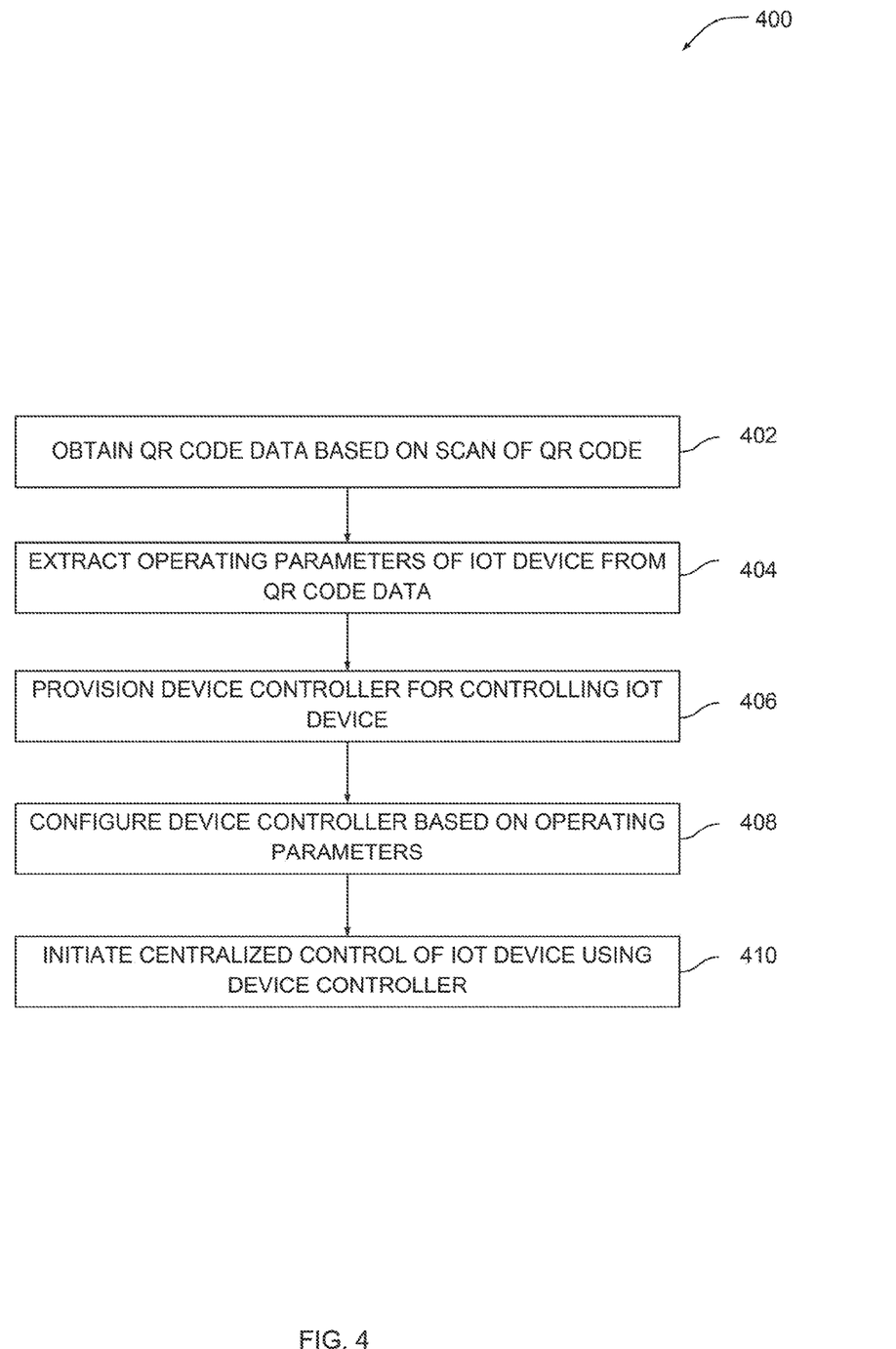
FIG. 4 is a flow diagram of method steps for configuring a node via a quick response code, according to various embodiments.

FIG. 4 is a flow diagram of method steps for configuring a node via a quick response code, according to various embodiments. Although the method steps are described in conjunction with the systems of FIGS. 1-3C, persons skilled in the art will understand that any system can be configured to perform the method steps in any order.

As shown, a method 400 begins at step 402, where central controller 156 obtains QR code data based on a scan of a QR code. The QR code is affixed to an IoT device, such as a node 130, and encodes operating parameters and other metadata associated with that device. Central controller 156 may obtain the QR code data from an installation application executing on a portable device that is operated by a technician who installs the IoT device. At step 404, central controller 156 extracts the operating parameters associated with the IoT device from the QR code data.

At step 406, central controller 156 generates and provisions a device controller 158 for controlling the IoT device. Central controller 156 may allocate storage and/or processor time to device controller 158 in performing this provisioning operation. At step 408, central controller 156 configures device controller 158 based on the operating parameters extracted from the QR code data. Central controller 156 could, for example, set various constants included in device controller 158 with corresponding values specified in the extracted operating parameters. At step 410, central controller 156 initiates centralized control of the IoT device using device controller 158. In performing step 410, central controller 156 could cause device controller 158 to install a client program on the IoT device to facilitate communication and control of that device. Alternatively, central controller 156 could cause device controller 158 to control the IoT device remotely.

Exemplary Computing Device

FIG. 5 illustrates a computing device that can be implemented in the system of FIG. 1, according to various embodiments. As shown, computing device 500 includes a processor 510, input/output (I/O) devices 520, and memory 530. Memory 530 includes a software application 532 and a database 534. Processor 510 may include any hardware configured to process data and execute software applications. I/O devices 520 include devices configured to receive input, devices configured to provide output, and devices configured to both receive input and provide output. Memory 530 may be implemented by any technically feasible storage medium. Software application 532 includes program code that, when executed by processor 510, performs any of the functionality described herein. Software application could be, for example, central controller 156, device controller 158, or client program 216. Software application 532 may access data stored in database 534. Those skilled in the art will understand that computing device 500 is provided for exemplary purposes only and not meant to limit the scope of the present embodiments.

In sum, a central controller is configured to obtain a scan of a quick response (QR) code affixed to an internet-of-things (IoT) device. The central controller decodes the QR code to extract various operating parameters associated with the IoT device. The central controller then provisions a device controller for coordinating operation of the IoT device. The central controller configures the device controller based on the operating parameters, thereby allowing the device controller to coordinate operations of the IoT device in a device-specific manner. The central controller may then install the device controller on the IoT device, or cause the device controller to coordinate IoT device operations across a network.

One advantage of the techniques described herein is that a technician no longer needs to manually obtain the various operating parameters associated with the IoT device during installation. Another advantage is that the technician no longer needs to manually input these operating parameters to the central controller to configure the IoT device. Accordingly, the disclosed techniques eliminate multiple manually-performed steps from a conventional IoT device installation procedure. Therefore, these techniques represent a technological advancement compared to conventional approaches.

1. Some embodiments include a computer-implemented method for controlling nodes across a mesh network, the method comprising: processing an image to extract a set of operating parameters associated with a first node that is coupled to the mesh network; configuring a first device controller based on the set of operating parameters extracted from the image, wherein the first device controller controls the first node across the mesh network; and causing the first node to perform at least one operation based on one or more operating parameters included in the set of operating parameters.

2. The computer-implemented method of clause 1, wherein the image corresponds to a quick response code that encodes the set of operating parameters.

3. The computer-implemented method of any of clauses 1 and 2, further comprising: processing the image to extract metadata associated with the first node; parsing the metadata to determine a device type associated with the first node; and generating the first device controller based on the device type associated with the first node.

4. The computer-implemented method of any of clauses 1, 2, and 3, wherein generating the first device controller comprises provisioning at least one of a storage resource and a computing resource for executing the first device controller.

5. The computer-implemented method of any of clauses 1, 2, 3, and 4, wherein configuring the first device controller comprises setting a value of a first constant included in the device controller equal to a first operating parameter included in the set of operating parameters.

6. The computer-implemented method of any of clauses 1, 2, 3, 4, and 5, wherein the first device controller executes at least one instruction based on the one or more operating parameters included in the set of operating parameters to cause the first node to perform the at least one operation.

7. The computer-implemented method of any of clauses 1, 2, 3, 4, 5, and 6, wherein the first node comprises a luminaire device, and wherein the set of operating parameters includes at least one of an operating wattage of the luminaire device, a lumen output of the luminaire device, and a maximum operating temperature of the luminaire device.

8. The computer-implemented method of any of clauses 1, 2, 3, 4, 5, 6, and 7, further comprising transmitting a first portion of the device controller to the first node.

9. The computer-implemented method of any of clauses 1, 2, 3, 4, 5, 6, 7, and 8, wherein the first node executes the first portion of the device controller to perform the at least one operation.

10. The computer-implemented method of any of clauses 1, 2, 3, 4, 5, 6, 7, 8, and 9, wherein the first node executes the first portion of the device controller to communicate with a second node included in the mesh network.

11. Some embodiments include a non-transitory computer-readable medium that, when executed by the processor, causes the processor to control nodes across a mesh network by performing the steps of: processing an image to extract a set of operating parameters associated with a first node that is coupled to the mesh network; configuring a first device controller based on the set of operating parameters extracted from the image, wherein the first device controller controls the first node across the mesh network; and causing the first node to perform at least one operation based on one or more operating parameters included in the set of operating parameters.

12. The non-transitory computer-readable medium of claim 11, wherein the image corresponds to a quick response code that encodes the set of operating parameters.

13. The non-transitory computer-readable medium of any of clauses 11 and 12, further comprising the steps of: processing the image to extract metadata associated with the first node; parsing the metadata to determine a device type associated with the first node; and generating the first device controller based on the device type associated with the first node.

14. The non-transitory computer-readable medium of any of clauses 11, 12, and 13, wherein generating the first device controller comprises provisioning at least one of a storage resource and a computing resource for executing the first device controller.

15. The non-transitory computer-readable medium of any of clauses 11, 12, 13, and 14, wherein the step of configuring the first device controller comprises setting a value of a first constant included in the device controller equal to a first operating parameter included in the set of operating parameters.

16. The non-transitory computer-readable medium of any of clauses 11, 12, 13, 14, and 15, wherein the first device controller executes at least one instruction based on the one or more operating parameters included in the set of operating parameters to cause the first node to perform the at least one operation.

17. The non-transitory computer-readable medium of any of clauses 11, 12, 13, 14, 15, and 16, wherein the first node comprises a luminaire device, and wherein the set of operating parameters includes at least one of an operating wattage of the luminaire device, a lumen output of the luminaire device, and a maximum operating temperature of the luminaire device.

18. The non-transitory computer-readable medium of any of clauses 11, 12, 13, 14, 15, 16, and 17, further comprising the step of transmitting a first portion of the device controller to the first node, wherein the first node executes the first portion of the device controller to perform the at least one operation and to communicate with a second node included in the mesh network.

19. Some embodiments include a system, comprising: a node that resides within a mesh network; a server coupled to the mesh network and configured to perform the steps of: processing an image to extract a set of operating parameters associated with the node; configuring a first device controller based on the set of operating parameters extracted from the image, wherein the first device controller controls the node across the mesh network, and causing the node to perform at least one operation based on one or more operating parameters included in the set of operating parameters; and a mobile device coupled to the server via a cell network and configured to: capture the image, and transmit the image to the server via the cell network.

20. The system of clause 19, wherein the server includes: a memory storing a central controller; and a processor that, when executing the central controller, is configured to: process the image, configure the first device controller, and cause the node to perform the at least one operation.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A method comprising:
receiving, by a first device from a second device, a set of operating parameters for controlling one or more functions of a first node, the set of operating parameters being extracted from an image captured by the second device, the first device and the second device being external to the first node;
configuring, by the first device, a first device controller executing on the first device based on the set of operating parameters extracted from the image, wherein the first device controller controls the first node across a mesh network;
monitoring, by the first device via the first device controller, the one or more functions of the first node based on one or more operating parameters included in the set of operating parameters; and
in response to monitoring the one or more functions, issuing, by the first device via the first device controller, one or more commands to the first node to cause the first node to perform at least one operation based on the one or more operating parameters.

2. The method of claim 1, wherein the image corresponds to a quick response code that encodes the set of operating parameters.

3. The method of claim 1, further comprising:
processing the image to extract metadata associated with the first node;
parsing the metadata to determine a device type associated with the first node; and
generating the first device controller based on the device type associated with the first node.

4. The method of claim 3, wherein generating the first device controller comprises provisioning at least one of a storage resource or a computing resource for executing the first device controller.

5. The method of claim 1, wherein configuring the first device controller comprises setting a value of a first constant included in the first device controller equal to a first operating parameter included in the set of operating parameters.

6. The method of claim 1, wherein the first device controller executes at least one instruction based on the one or more operating parameters included in the set of operating parameters to issue the one or more commands to the first node to cause the first node to perform the at least one operation.

7. The method of claim 1, wherein the first node comprises a luminaire device, and wherein the set of operating parameters includes at least one of an operating wattage of the luminaire device, a lumen output of the luminaire device, or a maximum operating temperature of the luminaire device.

8. The method of claim 1, further comprising transmitting a first portion of the first device controller to the first node.

9. The method of claim 8, wherein the first node executes the first portion of the first device controller to perform the at least one operation.

10. The method of claim 8, wherein the first node executes the first portion of the first device controller to communicate with a second node included in the mesh network.

11. One or more non-transitory computer-readable media that, when executed by one or more processors of a first device, cause the one or more processors to perform the steps of:
receiving, from a second device, a set of operating parameters for controlling one or more functions of a first node, the set of operating parameters being extracted from an image captured by the second device, the first device and the second device being external to the first node;
configuring a first device controller executing on the first device based on the set of operating parameters extracted from the image, wherein the first device controller controls the first node across a mesh network;
monitoring, via the first device controller, the one or more functions of the first node based on one or more operating parameters included in the set of operating parameters; and
in response to monitoring the one or more functions, issuing, via the first device controller, one or more commands to the first node to cause the first node to perform at least one operation based on the one or more operating parameters.

12. The one or more non-transitory computer-readable media of claim 11, wherein the image corresponds to a quick response code that encodes the set of operating parameters.

13. The one or more non-transitory computer-readable media of claim 11, further comprising the steps of:
processing the image to extract metadata associated with the first node;
parsing the metadata to determine a device type associated with the first node; and
generating the first device controller based on the device type associated with the first node.

14. The one or more non-transitory computer-readable media of claim 13, wherein generating the first device controller comprises provisioning at least one of a storage resource or a computing resource for executing the first device controller.

15. The one or more non-transitory computer-readable media of claim 11, wherein the step of configuring the first device controller comprises setting a value of a first constant included in the first device controller equal to a first operating parameter included in the set of operating parameters.

16. The one or more non-transitory computer-readable media of claim 11, wherein the first device controller executes at least one instruction based on the one or more operating parameters included in the set of operating parameters to issue the one or more commands to the first node to cause the first node to perform the at least one operation.

17. The one or more non-transitory computer-readable media of claim 11, wherein the first node comprises a luminaire device, and wherein the set of operating parameters includes at least one of an operating wattage of the luminaire device, a lumen output of the luminaire device, or a maximum operating temperature of the luminaire device.

18. The one or more non-transitory computer-readable media of claim 11, further comprising the step of transmitting a first portion of the first device controller to the first node, wherein the first node executes the first portion of the first device controller to perform the at least one operation and to communicate with a second node included in the mesh network.

19. A system, comprising:
  a node that resides within a mesh network;
  a server coupled to the mesh network and configured to perform the steps of:
    receiving, by the server from a mobile device coupled to the server via a cell network, a set of operating parameters for controlling one or more functions of the node, the set of operating parameters being extracted from an image captured by the mobile device, the server and the mobile device being external to the node;
    configuring, by the server, a first device controller executing on the server based on the set of operating parameters extracted from the image, wherein the first device controller controls the node across the mesh network,
    monitoring, by the server via the first device controller, the one or more functions of the node based on one or more operating parameters included in the set of operating parameters, and
    in response to monitoring the one or more functions, issuing, by the server via the first device controller, one or more commands, via the first device controller, to the node to cause the node to perform at least one operation based on the one or more operating parameters; and
  the mobile device configured to:
    capture the image, and
    transmit the image to the server via the cell network.

20. The system of claim 19, wherein the server includes:
one or more memories storing a central controller; and
one or more processors that, when executing the central controller, are configured to:
  receive the set of operating parameters,
  configure the first device controller, and
  issue the one or more commands to the node to cause the node to perform the at least one operation.

* * * * *